Feb. 23, 1960   K. GEBELE   2,925,765
PHOTOGRAPHIC CAMERA
Filed Sept. 7, 1956   2 Sheets-Sheet 1
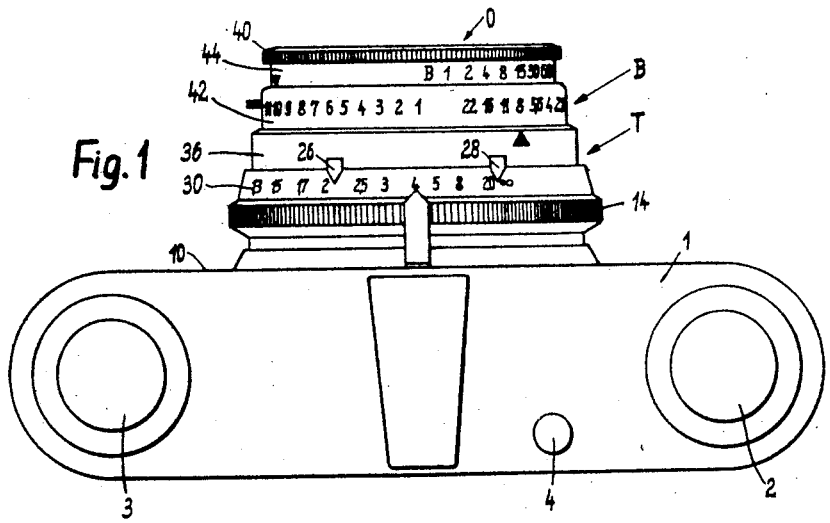
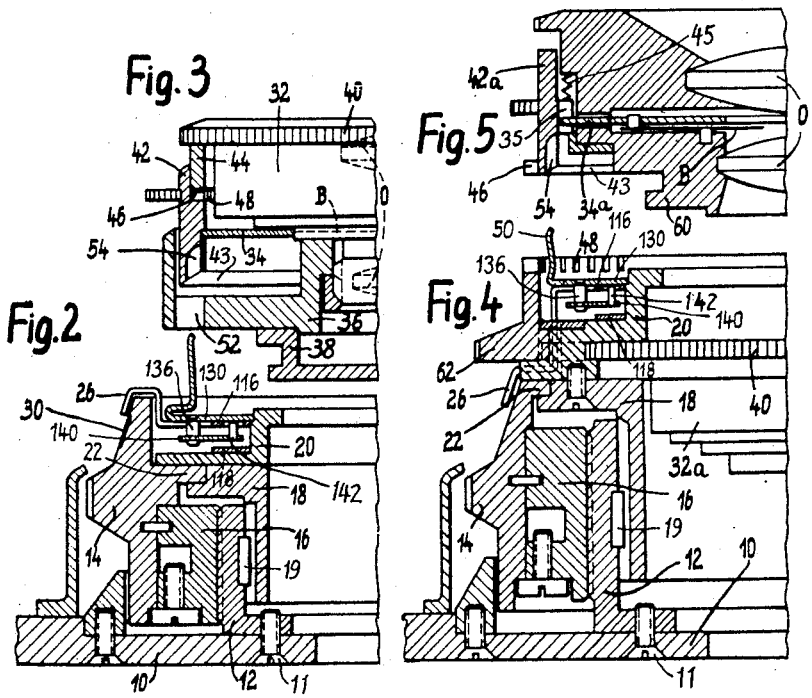

Feb. 23, 1960     K. GEBELE     2,925,765

PHOTOGRAPHIC CAMERA

Filed Sept. 7, 1956     2 Sheets-Sheet 2

United States Patent Office 2,925,765
Patented Feb. 23, 1960

2,925,765

PHOTOGRAPHIC CAMERA

Kurt Gebele, Munich, Germany, assignor to Compur-Werk Friedrich Deckel OHG, Munich, Germany, a German firm Application September 7, 1956, Serial No. 608,538

Claims priority, application Germany
September 9, 1955

3 Claims. (Cl. 95—64)

This invention relates to a photographic camera having both an adjustable diaphragm and a depth of field indicator operated at least in part by the adjustment of the diaphragm, and in which one of these parts (adjustable diaphragm or depth of field indicator) is mounted in an interchangeable unit separate from the unit (whether interchangeable or not) which carries the other of these parts.

An object of the invention is the provision of a generally improved and more satisfactory construction of this kind.

Another object is the provision of an improved and simplified form of driving connection between the adjustable diaphragm and the depth of field indicator, in a form which does not interfere with quickly disconnecting and reconnecting the driving connection when the interchangeable unit is removed from or replaced on the other unit.

Another object is the provision of a driving connection which will be automatically disconnected when the interchangeable unit is removed from the camera, and which will again be automatically connected in proper position of orientation when the interchangeable unit is replaced on the camera, without any special care or pains on the part of the operator.

These and other desirable objects may be attained in the manner disclosed as an illustrative embodiment of the invention in the following description and in the accompanying drawings forming a part hereof, in which:

Fig. 1 is a top plan view of a camera in accordance with one embodiment of the present invention;

Fig. 2 is a fragmentary radial section through the front wall of the camera and a unit which is mounted thereon and contains the depth of field indicator, illustrating a first embodiment of the invention;

Fig. 3 is a radial section through the other unit detachable from the unit shown in Fig. 2, showing it in detached position but ready to be coupled to the unit shown in Fig. 2, still illustrating the first embodiment of the invention;

Figs. 4 and 5 are views similar to Figs. 2 and 3, respectively, illustrating a second embodiment of the invention.

The same reference numerals throughout the several views indicate the same parts.

Figure 6:
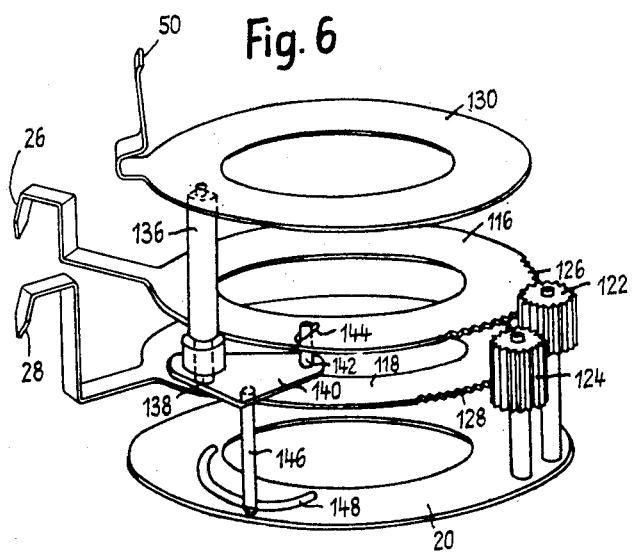
Fig. 6 is a perspectvie view of certain parts of the depth of field indicator in accordance with the first embodiment of the invention.

In Fig. 1 there is shown a camera which, in general, is of any suitable known construction, embodying a main body 1, having a film advancing or feeding knob 2 and a film rewinding knob 3, and a shutter release plunger or button 4. Mounted on the front wall 10 of the camera are suitable housing or casing units containing objective lenses indicated in general at O, and an adjustable iris diaphragm indicated in general at B, and a depth of field indicator shown in general at T.

The depth of field indicator is in a unit which is separate or detachable from the unit which carries the adjustable diaphragm B. It is immaterial for purposes of the present invention whether one or both of these units are detachable and interchangeable with respect to the camera, and if only one unit is interchangeable with respect to the camera, the other being permanently mounted on the camera, it is immaterial which unit is permanently mounted and which one is detachable, since the present invention deals with the driving connection between the two units, rather than with the details of the way in which one unit is mounted on the camera body.

Referring now to the structure shown in Figs. 2 and 3 as the first illustrative embodiment of the invention, the front wall 10 of the camera has permanently fastened to it, by screws 11, an externally threaded tube 12 concentric with the optical axis of the camera. A focus adjusting ring 14 surrounds the tube 12 and has a circumferential or peripheral rib which is knurled for easy grasping and turning when the camera is to be focused. Interposed between the focusing ring 14 and the threaded tube 12 is an internally threaded sleeve 16 in the form of a nut running on the threads of the tube 12, and pinned to the ring 14 to turn therewith, so that as the ring 14 is turned it rides forwardly or rearwardly, together with the nut 16, on the stationary tube 12.

The inner face of the tube 12 forms a smooth support and guideway for forward and backward movement of a tube 18 which moves axially but is held against rotation by means of a key 19 fixed to the tube 12 and engaging in an axial slot of the tube 18. A bayonet ring member 20 is fixed firmly to the forward end of the tube 18. The front end of the ring 20 has the usual bayonet lugs for detachable interengagement with the bayonet connecting parts of a detachable unit, while the rear end of the ring 20 has a flange which extends radially outwardly in overlying relation to a flange 22 on the focus adjusting ring 14, the inner edge of the radial flange 22 being rotatable in a snug space between the parts 18 and 20 so that the forward or rearward motion of the ring 14 is transmitted to the parts 18, 20.

The present invention relates to the coupling of the depth of field indicating mechanism to the adjustable diaphragm mechanism, rather than to the exact details of the depth of field indicator itself. As a convenient example, however, the depth of field indicating mechanism may be constructed approximately as disclosed in the copending U.S. patent applications of Franz Singer, Serial No. 555,964, filed December 28, 1955, and Kurt Gebele, Serial No. 557,183, filed January 3, 1956, both owned by the assignee of this present application. It may include, for instance, a main driving ring 130 (Figs. 2 and 6) driven from the adjustable iris diaphragm by the coupling means hereafter described, which ring 130 is rotatable coaxially with the optical axis on a shoulder formed near the front of the member 20 as seen in Fig. 2. Behind this ring 130 is a ring 116 also rotatable on the tube 20 coaxially with the optical axis, and carrying a radial extension bent around the front edge of the adjusting ring 14 to constitute a depth of field indicating pointer 26 cooperating with the focus distance scale 30 marked on the periphery of the ring 14.

Behind the ring 116 is another ring 118 likewise rotatable coaxially with the optical axis and carrying another radially extending arm likewise bent around the front edge of the focus adjusting ring 14 to constitute a second depth of field indicating pointer 28 cooperating with the same focus distance scale 30. The depth of field, that is, the maximum and minimum distances at which objects in the field of view will be in sharp focus on the film, for any given setting of the diaphragm and of the focus adjustment, is indicated by reading on the scale 30 the focus distances between the two pointers 26 and 28.

These pointers 26 and 28, and their respective rings 116 and 118, are driven from the driving ring 130 in any suitable manner, such as by the means disclosed in said two copending patent applications. For instance, as best seen in Fig. 6, the ring 130 may have a rearwardly extending post 136 fixed firmly to it, the rear end of which post supports one end of a pivoted lever 140, the other end of which has a forwardly extending pin 142 extending into an approximately radial slot 144 in the ring 116. At an intermediate point the lever 140 has a rearwardly extending pin 146 entering a cam slot 148 in a suitable non-rotatable member such as the outwardly extending flange of the ring 20. When the operating ring 130 is turned (by adjusting the diaphragm aperture, as explained below) the post 136 and lever 140 will be carried bodily with it, and the rotary motion thereof will be transmitted through the pin 142 and slot 144 to the ring 116, but with a correction or slight additional movement due to the swinging of the lever 140 caused by the correcting cam 148, properly shaped to take into account the fact that the focus distance scale 30 bears a non-linear relationship to the diaphragm aperture scale, as well understood by those skilled in the art.

This mechanism serves to turn the first depth of field indicating pointer 26 from the turning movements of the ring 130, with the necessary correction caused by the cam 148. The second ring 118 is turned an equal amount in the opposite direction, by means of the pinions 122 and 124 rotatable on stationary posts fixed to the member 20, which pinions are of the same diameter and mesh with each other so that when one turns, the other turns in the opposite direction to the same extent. The first pinion 122 meshes also with gear teeth 126 on the periphery of the ring 116, while the second pinion 124 meshes also with gear teeth 128 on the periphery of the ring 118. By this arrangement, the rotation imparted to the ring 116 by turning the ring 130 causes equal rotation in the opposite direction of the other ring 118 carrying the other depth of field pointer 28, so that as the ring 130 turns in one direction or the other, the two pointers 26 and 28 will move toward or away from each other to subtend different intervals on the focus distance scale 30.

The adjustable diaphragm (preferably of the iris type) is in a separate unit which is readily detachable from and interchangeable with respect to the parts 14, 18, 20. This separate or front unit may include, for example, a main body part 36 which has at its rear end the bayonet connection ring 38 adapted to mate in the usual manner with and connect the front unit firmly but detachably to the bayonet ring part 20 of the rear unit which stays on the camera. This body part 36 suitably grasps the rear lens tube of an objective shutter of any conventional kind (e.g., a shutter of the form disclosed in U.S. Patent 1,687,123) the main part of the shutter housing being indicated in general at 32. The shutter carries the usual lenses O mounted in its usual front and rear lens tubes, and contains the usual iris diaphragm B adjustable to various apertures by turning the usual diaphragm adjusting ring 34 rotatably mounted near the rear of the shutter casing, which diaphragm adjusting ring 34 has resilient radial arms extending outwardly and fixed in a non-rotatable manner to a larger external diaphragm adjusting ring 42 in the form of an approximately cylindrical flange of sufficient length to surround and overlie part of the axial length of the shutter casing 32 as well as the diaphragm ring 34 and to extend somewhat rearwardly from the transverse plane of the latter, all as well seen in Fig. 3.

The front of the shutter 32 carries the usual shutter speed adjusting ring 40 rotatable about the optical axis as a center, which speed adjusting ring 40 has a rearwardly extending cylindrical flange 44 fixed to it and telescoping inside the front part of the ring 42 which constitutes the external diaphragm adjusting member. To couple the parts 42 and 44 together for conjoint rotary movement, the rear edge of the flange 44 is provided with a tooth 46 which may engage in one or another of the coupling notches 48 formed on the front edge of the inner shoulder of the member 42. The resilience of the member 34 tends to move the flange 42 forwardly to keep the parts coupled, so that they turn together. But by grasping the member 42 or a suitable finger piece thereon and moving it rearwardly against the resilient forward thrust of the member 34, the tooth 46 may be uncoupled from the notches 48 so that the ring 42 may be turned without turning the ring 44, and then may again be moved forwardly to couple the parts in a new relative position of orientation, whereupon the parts may be turned conjointly to vary the diaphragm aperture and the shutter speed in a complementary manner, without altering the exposure value.

Referring now to the coupling between the depth of field indicating mechanism and the diaphragm aperture adjusting mechanism, this is accomplished, according to the present invention, by providing the ring 130 of the depth of field indicating mechanism with a forwardly extending resilient coupling tongue 50, as seen in Figs. 2 and 6. When the unit 36, 38 is mounted in the normal position on the unit 18, 20, the resilient tongue 50 extends forwardly through an arcuate slot 52 in the body 36 of the front unit, and engages into a driving slot 54 formed at one point in the inner face of the rear part of the diaphragm adjusting ring 42. The rest of the inner face of the rear part of the ring 42 is smooth and unbroken, except for this one notch 54. The rear end of the ring 42 is slightly beveled inwardly, as seen at 43 in Fig. 3, to engage with the forward end of the tongue 50 when the front unit is being applied to the rear unit, so as to force the front end of the resilient tongue 50 radially inwardly toward the optical axis so that it will lie on the smooth inner face of the ring 42, if the notch 54 does not happen to be exactly opposite the tongue 50 at the time that the two units are brought together.

Hence it does not matter whether the parts are previously arranged in position so that the notch 54 is opposite the tongue 50, when the two units are engaged with each other. Regardless of the fact that the notch and the tongue may not be opposite each other, the tongue will slide against the smooth inner face of the ring 42, when the units are attached. Then upon the next rotation of the ring 42 in one direction or the other, the tongue 50 will spring into the notch 54 as soon as the notch comes opposite the tongue, thereby establishing the desired coupling action between the diaphragm aperture adjusting parts and the depth of field adjusting parts, in the proper relative position of orientation with respect to each other.

Referring now to Figs. 4 and 5 of the drawings, there is shown a second embodiment of the subject matter of the present invention. In this construction, the shutter 32 is carried by the rear unit, which also includes the depth of field indicating mechanisms, while the front unit carries the detachable and interchangeable lenses O and the adjustable diaphragm B, but not the shutter. However, this construction embodies the same principles above set forth.

Most of the parts of the second embodiment of the invention are substantially the same in purpose, function, and arrangement as the corresponding parts of the first embodiment, and are identified by the same respective reference numerals, so that such parts need no additional detailed description, notwithstanding that the parts may have slightly different shapes from the corresponding parts in the first embodiment. Only a few parts are sufficiently different to make the use of different reference numerals advisable. For instance, the main body of the detachable front unit is here indicated at 60, having bayonet lugs for engaging with the bayonet ring 20 of the rear unit. It contains the lenses O and the adjustable iris diaphragm B, the internal adjusting ring of which is shown at 34a and which has an outer end extending into an axial slot 35 in the ring 42a mounted for limited axial movement on the unit body 60 and normally pressed toward the rearward limit of its movement by a few light springs 45 arranged at intervals around the periphery.

The shutter 32a may here correspond substantially to the shutter 32 of the first embodiment, except that the adjustable iris diaphragm is omitted from this shutter and at least some of the lenses are omitted from the shutter, being placed instead in the front unit 60, and the shutter 32a is mounted in the rear unit instead of the front unit, as for example being clamped between suitable shoulders or parts of the members 18 and 20 of the rear unit. The shutter speed setting ring 40 is rotatable as before and is operatively connected to an outer speed setting ring 62 rotatable on the outside of the part 20 of the rear unit, and having a nurled circumferential flange for manual grasping, and a forwardly projecting flange which, at its front end, contains the coupling notches 48 for engagement with the coupling tooth 46 at the rear end of the above mentioned diaphragm adjusting ring 42a.

In this second embodiment, the depth of field indicating pointers 26 and 28 are mounted on the rings 116 and 118 as before, and operate as before but are of somewhat different shape so as to extend through the proper arcuate slots in the member 20 and cooperate with the focus distance scale on the member 14. The operating ring 130, as before, is provided with a forwardly extending resilient tongue 50 which enters the coupling notch 54 on the inner face of the ring 42a when the two units are brought together into mating engagement, in substantially the same manner previously described. If the coupling notch 54 does not happen to be opposite the tongue 50 when the front unit is placed on the rear unit, the tongue 50 is displaced inwardly by the beveled edge 43 of the ring 42a, so as to lie against the smooth inner face of the ring 42a, until the next rotation of the ring, whereupon the resilient tongue 50 will snap into the notch 54 when the notch comes opposite the tongue, just as previously described in connection with the first embodiment.

For coupling the diaphragm adjusting ring to the shutter speed setting ring in various positions of orientation, to effect different exposure values, the ring 42a or a suitable finger piece thereon is urged forwardly against the action of the springs 45, to withdraw the tooth 46 from the notch 48 in which it is seated. Then while holding it forwardly, the ring 42a is turned to the desired position of orientation for the particular exposure value which is desired, and then when it is released the springs 45 move the ring 42a rearwardly again to seat the tongue 46 in one of the coupling notches 48. Thereafter, the diaphragm aperture and the shutter speed are both simultaneously adjusted in a complementary manner by turning the ring 62, which turns the ring 42a because of the coupling through the tooth 46. The turning of the ring 42a, through the coupling effected by the notch 54 and tongue 50, serves to turn the depth of field indicating parts in accordance with the change in diaphragm aperture. The coupling notch 54 is sufficiently long, and the tongue 50 extends a sufficient distance into this notch, so that the parts 50, 54 do not become uncoupled when the ring 42a is moved forwardly to shift the tooth 46 out of one notch 48 and move it to another notch 48.

Since the invention deals with the coupling of the depth of field indicating mechanism to the diaphragm aperture adjusting mechanism regardless of which one of these mechanisms happens to be on the interchangeable or replaceable unit, it follows that there can be considerable variation from the specific structures shown in the drawings, without departing from the real invention. For instance, the adjustable diaphragm may be on the rear unit, possibly mounted permanently on the camera or possibly detachable and interchangeable with respect to the camera, while the depth of field indicating mechanism may be on the front unit detachable and interchangeable with respect to the rear unit which carries the diaphragm. Or again, it is possible without departing from the invention to develop the coupling parts in such manner that they can be disengaged only after actuation of a positive latch or locking member. Or again, it is possible to provide a plurality of different focusing distance scales for cooperation with the depth of field indicating pointers when used with different lenses having different focal lengths or other different optical properties.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera assembly including a camera body, a unit including movable depth of field indicating mechanism, a second unit including an adjustable diaphragm and a movable diaphragm aperture adjusting part, said two units being detachably connected to each other and one of said units being mounted on said camera body, and interengaging relatively movable parts on said two units for coupling said depth of field indicating mechanism to said aperture adjusting part to drive the former from the latter, said interengaging parts including a notched element movably mounted on one of said units and a resilient tongue movably mounted on the other of said units for engaging in the notch of said notched element when the two units are normally engaged with each other, said resilient tongue and the notch of said notched element both extending approximately in the direction of relative motion of said two units when connecting them with or disconnecting them from each other, and said notched element having smooth surfaces on two opposite sides of said notch for engaging said tongue if said two units are connected to each other while said tongue is not alined with said notch, said tongue becoming seated in said notch when said notched element is subsequently moved to bring said notch opposite said tongue.

2. A construction as defined in claim 1, in which said notched element has a beveled surface facing toward the unit which carries said tongue, to guide said tongue onto a smooth surface of said notched element during movement of said two units toward each other.

3. A photographic camera assembly including a camera body having an optical axis, a first unit of annular form mounted on said body in axial alinement with said optical axis and including a depth of field indicating pointer mounted for movement circumferentially of said first unit and a pointer operating member having a coupling tongue projecting forwardly from said first unit, and a second unit also of annular form detachably mounted in front of said first unit in axial alinement with said optical axis, said second unit including a lens, an adjustable iris diaphragm, a diaphragm adjusting ring rotatably mounted for circumferential movement on the second unit, and a coupling notch in said diaphragm adjusting ring receiving said coupling tongue of said first unit so that rotation of said diaphragm adjusting ring on said second unit will move said pointer operating member of said first unit to cause circumferential movement of said pointer.

References Cited in the file of this patent

UNITED STATES PATENTS

| | | |
|---|---|---|
| 2,315,977 | Mihalyi | Apr. 6, 1943 |
| 2,519,989 | Wilkinson | Aug. 22, 1950 |

FOREIGN PATENTS

| | | |
|---|---|---|
| 1,095,630 | France | Dec. 22, 1954 |
| 1,111,448 | France | Oct. 26, 1955 |
| 1,126,831 | France | July 30, 1956 |